G. L. FORMAN.
WINKER BRACE.
APPLICATION FILED APR. 4, 1908.
911,966.
Patented Feb. 9, 1909.
3 SHEETS—SHEET 1.
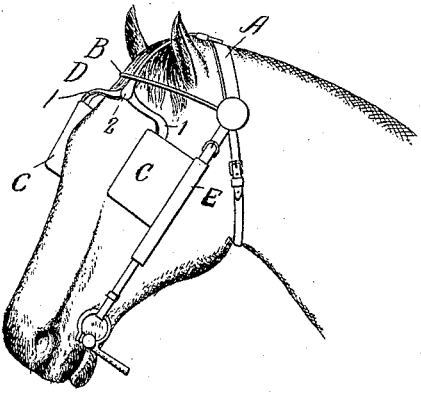
Fig. 1.
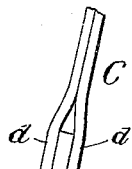
Fig. 2.
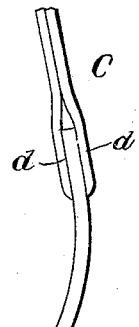
Fig. 4.
Fig. 3.
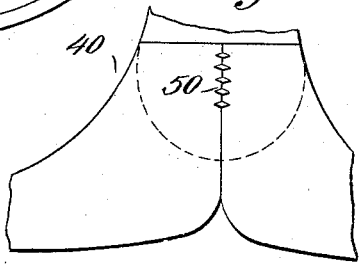
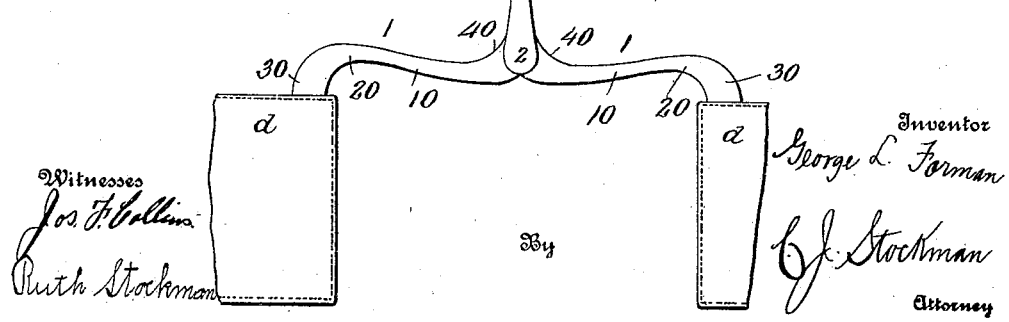
Witnesses
Jos. F. Collins
Ruth Stockman
Inventor
George L. Forman
C. J. Stockman
Attorney G. L. FORMAN.
WINKER BRACE.
APPLICATION FILED APR. 4, 1908.
911,966.
Patented Feb. 9, 1909.
3 SHEETS—SHEET 2.
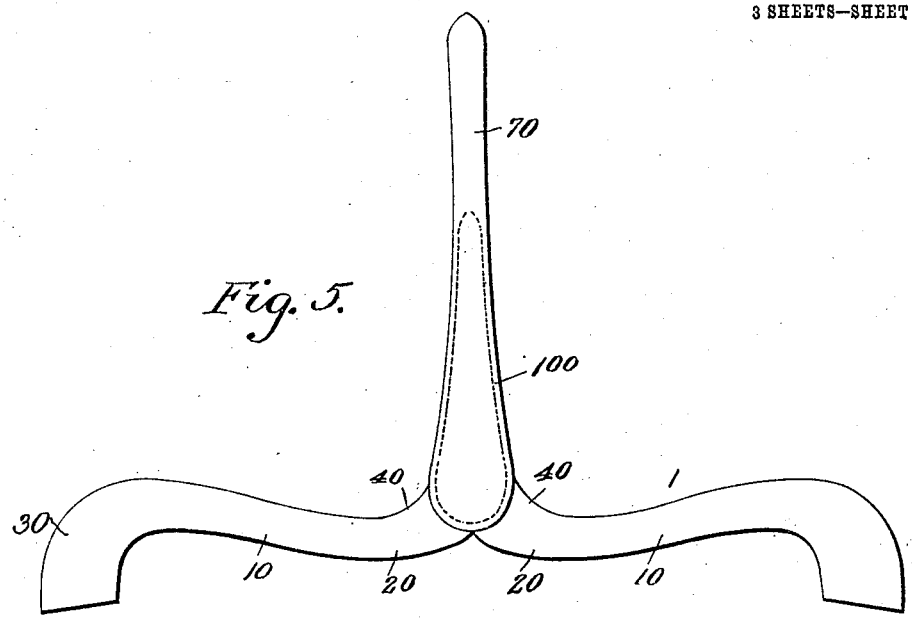
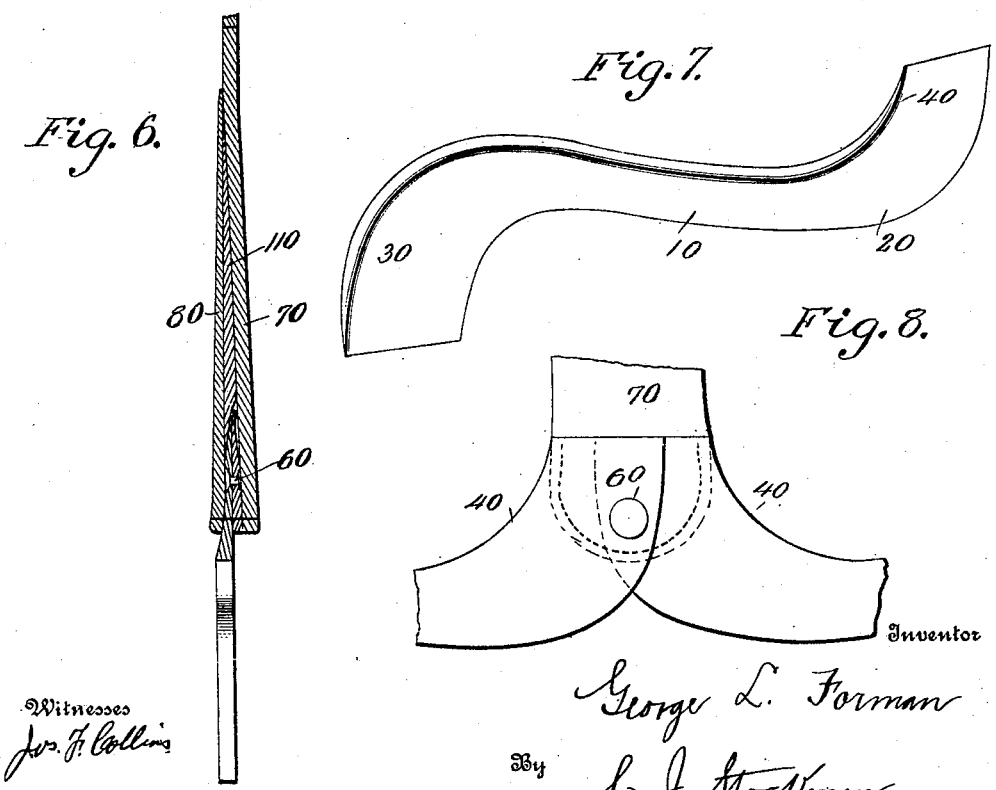

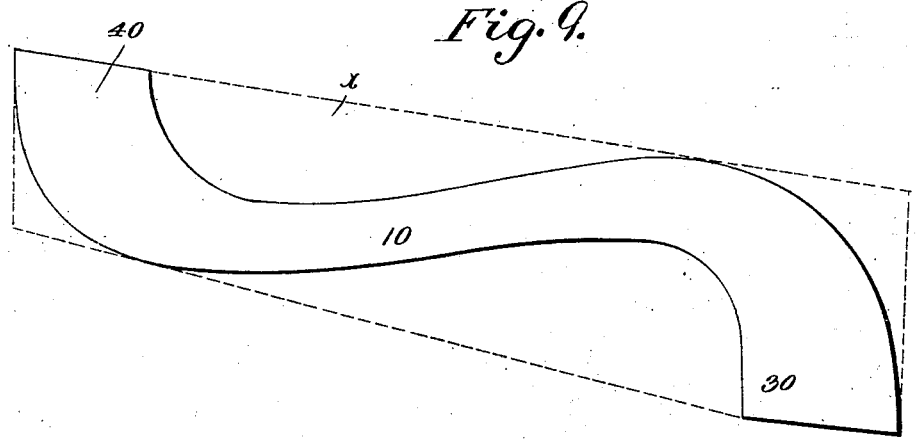
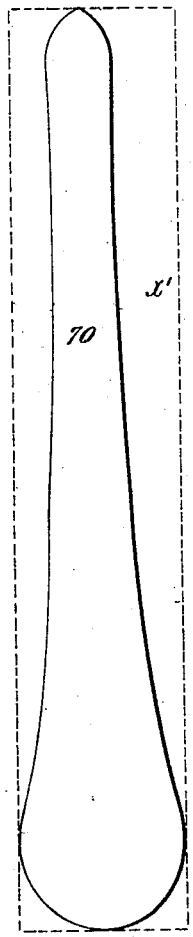
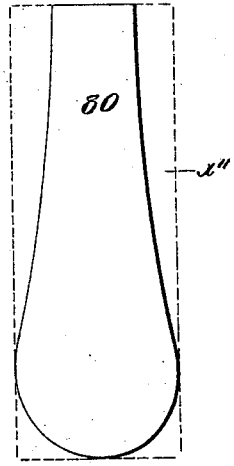

UNITED STATES PATENT OFFICE.

GEORGE L. FORMAN, OF LOUISVILLE, KENTUCKY.

WINKER-BRACE.

No. 911,966.  Specification of Letters Patent.  Patented Feb. 9, 1909.

Application filed April 4, 1908. Serial No. 425,102.

*To all whom it may concern:*

Be it known that I, GEORGE L. FORMAN, a citizen of the United States, residing at Louisville, in the county of Jefferson and State of Kentucky, have invented certain new and useful Improvements in Winker-Braces, of which the following is a specification.

This invention has special reference to improvements in the winker braces of harness bridles and consists in certain peculiarities in the construction and arrangement of parts substantially as hereinafter described and particularly pointed out in the subjoined claims.

It is a leading object of the present invention to produce a winker brace or stay which will act positively to force and hold the forward edges of the winkers or blinds away from the brow and eyes of the animal and will permanently maintain the form and rigidity which enables it to perform this function.

It is a further object of the invention to provide a winker brace of most inexpensive and durable construction and one which forms in use a natural bridge over the eyes of the animal and prevents any part of the bridle from coming in contact with said eyes and acts to resist all tendency of the blinds to fall toward each other both when the bridle is in use and when it is off of the animal, thereby giving rigidity to the entire headstall of the bridle, so to speak, making it easier to put on the horse and adding to its attractive appearance and salability.

A further purpose of the invention is to secure the foregoing advantageous results without the use of metal reinforcements or attachments.

A still further object is to secure these results in an all-leather brace which may be produced from scraps which are the waste produced in the manufacture of other parts of harness and which cannot be utilized in the manufacture of the winker braces hitherto proposed.

These several objects of the invention are all secured in a most effective way by the construction illustrated in the accompanying drawing in which—

Figure 1 is a perspective view showing a bridle and its blinds or winkers provided with my improved brace. Fig. 2 is a top plan view of the winker brace and a part of the winkers or blinds, showing the position of the same in use. Fig. 3 is a front view of the same parts, showing the position of the parts before they are attached to the bridle. Fig. 4 is an enlarged detail showing the preferred manner of connecting the forks of the brace to each other. Fig. 5 is a front view of the winker brace. Fig. 6 is a vertical section through the billet and the ends of the limbs of the fork, showing said ends secured together by a rivet. Fig. 7 is a detail perspective of one of the forks of the brace. Fig. 8 is a detail view showing the forks connected to each other by means similar to that illustrated in Fig. 6. Figs. 9, 10 and 11 are detail views of several parts of the brace, illustrating in dotted outline the blanks from which the same are produced.

The same characters of reference are used to designate the same parts in the several views.

The particular construction of the bridle, except as to the winker brace, is not essential to the present invention and need not be set forth in detail. Its parts need not be herein referred to further than to say that A designates the crown, B the front piece or brow band, C C the winkers or blinds, E the cheek pieces and D the winker brace. The latter comprises elements corresponding to those at present universally employed, to with a fork or members 1, 1 the lower ends of which are attached to the winkers or blinds, and a billet 2 by which the fork is connected to the crown A. These parts, however, are differently produced and of different shape from the corresponding parts of the ordinary brace, as will presently appear.

In order that my invention may be most clearly understood it is considered to be expedient briefly to describe the most commonly employed winker brace and method of producing the same and the several disadvantages thereof which it is the purpose of the present invention to overcome. It is the universal custom in the production of these braces for use and sale to produce them with their billets and fork integral, from a blank of leather essentially of a size adapted to contain within it both the billet and the fork. The first step in the manufacture of these braces is the cutting of these parts from such blank. The forks or limbs of the brace at this stage of the manufacture are approximately parallel with each other, the blank being merely cut or slitted longitudinally throughout a portion of its length to separate from each other the material which is to enter into the respective limbs of the fork. Sometimes the forks are left perfectly flat, sometimes they are doubled and stitched and rounded, but in all cases the limbs are subsequently bent to the diverging form which is essential to their use. As a preliminary to this step in the manufacture of these braces the forks or limbs are moistened or wetted and they are then molded, or shaped by a proper tool or by hand.

It is essential that the limbs maintain their shape in order that they may continue to exercise their required bracing effect on the blinds, it being apparent that any tendency of the limbs to resume their primary or initial parallel position similarly tends either to pull the forward edge of the blinds to the brow or over the eye of the animal or else to permit the blinds freely to swing to and fro against and away from the eye of the animal. It is well understood that it is the purpose of these braces to hold the blinds away from the eye of the animal, and it is equally well understood that the braces which I have described are wholly inefficient for the purpose, for the reason that they shortly, and particularly when they are again wet lose their power of maintaining the form to which they were shaped while wet. They thus straighten out toward their primary or initial form, in which as already suggested they exercise no stiffening or bracing effect on the winkers or blinds. To overcome this it has been proposed to reinforce the limbs by means of interior strips of spring metal, but such reinforced braces have not been commonly adopted for reasons which need not be herein stated.

The fork of the brace of the present invention, as embodied in a bridle for single harness, is composed of two separately formed limbs 1, 1 each of which comprises the approximately horizontal body part 10 of such length and flexibility as to enable it to be bent around the brow of the animal, having at one end the laterally extending extremity 30 which is much broader than the body part 10 and is to be attached to the winker or blinds C. The edges of the part 30 at their junction with the body part 10 are preferably formed of curves of different radii. The other end of each body part 10 preferably is also provided with a laterally extending end 40 which projects therefrom in a direction opposite to that of the end 30. The ends 40 of the two limbs are adapted for attachment to each other and to the billet 2. Each of these straps is produced in the shape described, entirely by cutting it, by means of a suitable die or otherwise, from a blank such as is indicated by the dotted outline X in Fig. 9. After they have been secured to the billet 2 and the blind C, and after these parts have been attached to the bridle, the buckling of the cheek pieces to the crown of the bridle bends the forks or limbs in a wide curve, at the junction of the bodies 10 and ends 30, around the brow of the animal and when the brace is put under the brow band B and the billet is buckled to the crown A the center of the brace is drawn to the center of the forehead. The brace is thereby caused to assume the position of use, with its extremities 30 extended downward to the forward edge of the winker and arranged rearwardly of the bodies 10. The bodies 10 thus form a bridge across and above the eyes of the animal, the limbs respectively extending gradually outward from the center of the forehead over and out of contact with the bone above the eyes and thence around and rearward to the upper forward edges of the winkers. In this position of the parts there is no possibility of the brace or winkers coming into contact with the eyes. When thus bent the bit and the cheek pieces hold the rear edges of the blinds toward the head and a tension is put on the limbs of the brace which acts to force and hold the forward edge of the winkers away from the eyes: and it will be noted that as the fork is cut to the shape named and is not bent or molded thereto while wet there is no tendency for its limbs to assume a position parallel with each other and they therefore lastingly maintain their bracing effect. Moreover, it will be seen that the widened ends 30 of the brace enhance the durability of the bridle to a very material extent by enabling the brace to withstand the strain of the bending and to hold its bended position and also by providing a means through which the brace may be stitched securely to the winker C. These ends thus overcome the inherent weakness which now characterizes this part of the bridle, as well as increase the tendency of the brace to throw the forward edges of the winkers away from the eyes.

The abutting widened ends 40 are preferably stitched together as shown at 50 in Fig. 4, but it is within the scope of the invention to secure these ends otherwise. Thus, I have in Figs. 6 and 8 shown them as reduced in thickness, overlapped and secured by a rivet 60, as an example of another means which may be employed to secure them together, but I prefer the former method for the reason that most harness makers consider the use of rivets, or other metallic fastenings, as inadvisable in such situations as the present one. The billet 2 similarly is made in two separate parts 70 and 80, which are respectively cut from blanks X' and X''. Between these two parts the ends 40 of the two limbs 1 are arranged and the whole are stitched together, as indicated at 100 in Fig. 5. A filler 110 may, if desired, be also inserted between the parts of the billet, as shown in Fig. 6. This completes the formation of the brace and it remains only to attach it to the winkers or blinds C C which is accomplished by stitching its widened ends 30 to the latter, between the layers d d thereof.

It is not essential that the ends 30 be made integral with the body 10, or that two separately formed limbs be employed, it being within the purview of the invention in its broader aspects to form the ends 30 separate from the body part and adapted to be secured thereto, and to form the body part of a continuous piece extending from one part 30 to the other and adapted either for attachment to the crown of the bridle, or not, as desired in particular cases. The construction illustrated, however, is greatly preferred and most fully embodies the advantages outlined herein.

While I have illustrated and described the limbs of the brace as made of one thickness of material; it will be apparent that they may be made of a plurality of layers, though I do not consider this to be either necessary or advisable. It is also apparent that other changes may be made in the detail embodiment of the invention herein illustrated without departure from the scope of the invention and appended claims.

Having thus described the invention what I believe to be new and desire to secure by Letters Patent, is:—

1. A winker brace comprising a plurality of limbs each having a flexible body and an end which projects laterally from the body and is adapted to be secured to a winker, said brace being cut to said shape, substantially as described and for the purposes specified.

2. A winker brace comprising a plurality of parts each having an end portion arranged at an angle with its remaining portion and of greater diameter than the same and adapted to be secured to a winker, each of said parts being cut to the shape stated, and means for connecting said parts with each other.

3. In combination with winkers, a brace comprising a plurality of limbs, a billet to which contiguous ends of the limbs are secured and winkers to which the other ends of the limbs are secured, each of said limbs being cut to a shape which comprises a body part having an end portion arranged at an angle thereto and extending to the adjacent winker, said body part being flexible and bent rearward adjacent to the end portion, whereby the forward edge of the latter is also arranged rearward of the body part.

4. In combination with winkers, a brace comprising a plurality of limbs, a billet to which contiguous ends of the limbs are secured and winkers to which the other ends of the limbs are secured, each of said limbs being cut to a shape which comprises a body part having an end portion wider than the body part and arranged at an angle thereto and extending to the adjacent winker, said body part being flexible and bent rearward adjacent to the end portion, whereby the forward edge of the latter is also arranged rearward of the body part.

5. In combination with winkers, a brace therefor comprising a billet and separately formed limbs each cut to shape, each limb comprising a body and laterally-projecting ends wider than the body, said bodies secured to the billet and extending in opposite directions therefrom and adapted to be bent adjacent to the ends, and said ends secured to the upper forward ends of the winker and arranged rearward of the bodies.

6. The herein described winker brace consisting of two straps each having an approximately horizontal body part adapted in length to be bent in a wide curve around the brow of the animal, and terminating in widened ends extending laterally in opposite directions therefrom, two of said ends arranged in juxtaposition to each other and the other two adapted for attachment to the winkers or blinds; and a billet of separate formation secured to the contiguous ends of the straps.

7. The herein described winker brace consisting of two straps each having an approximately horizontal body part adapted in length to be bent in a wide curve around the brow of the animal, and terminating in widened ends extending laterally in opposite directions therefrom, two of said ends arranged in juxtaposition to each other and the other two adapted for attachment to the winkers or blinds; and a billet of separate formation secured to the contiguous ends of the straps, and comprising two separate straps arranged on opposite sides of said ends.

In testimony whereof I affix my signature in presence of two witnesses.

GEORGE L. FORMAN.

Witnesses:
AUGUSTA DEMING,
RAY MCGRATH.